Patented Dec. 6, 1949

2,490,276

UNITED STATES PATENT OFFICE 2,490,276

PREPARATION OF TRIPTANE STRUCTURE COMPOUNDS

John C. Munday, Cranford, and Alfred H. Matuszak, Jersey City, N. J., assignors to Standard Oil Development Company, a corporation of Delaware No Drawing. Application April 12, 1946,
Serial No. 661,872

7 Claims. (Cl. 260—338)

This invention relates to a process for the preparation of compounds having the carbon structure of the parent hydrocarbon, 2,2,3-trimethylbutane, which is also well known by the common name triptane.

The known methods of preparing compounds having the corresponding olefin structure involve the use of the Grignard reaction wherein magnesium is used, or a similar reaction wherein zinc is used, or involve methylation with methyl halide. All of these methods are so expensive as to preclude large scale use of triptane. Furthermore, with the exception of simple addition products of the corresponding olefin, the products obtained are not readily converted into chemical derivatives of triptane.

It has now been discovered that compounds having the carbon structure of 2,2,3-trimethylbutane are readily made by the addition of formaldehyde to dimethyl butene in the presence of a suitable catalyst. Formaldehyde may be used in any form which readily yields free formaldehyde in the course of the reaction. Aqueous formaldehyde is suitable and polymers of formaldehyde, such as para-formaldehyde, readily react. The derivatives obtained by the addition are readily converted to other compounds having a triptane structure by simple procedures.

This invention has for an object the preparation of compounds having a 2,2,3-trimethylbutane structure.

Another object of the invention is to prepare compounds having a triptane structure which can be readily converted to other compounds having a triptane structure.

A still further object of this invention is to prepare compounds having a 2,2,3-trimethylbutane structure by an efficient and economical method.

According to this invention, one or two mols of formaldehyde may be added to dimethyl butene probably according to the following equations which illustrate the addition to the isomeric dimethyl butenes:

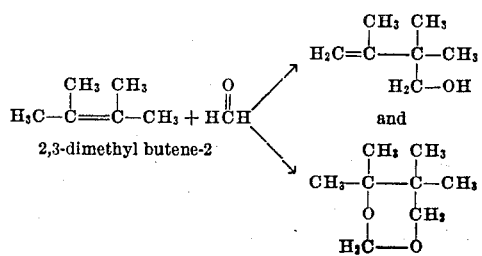

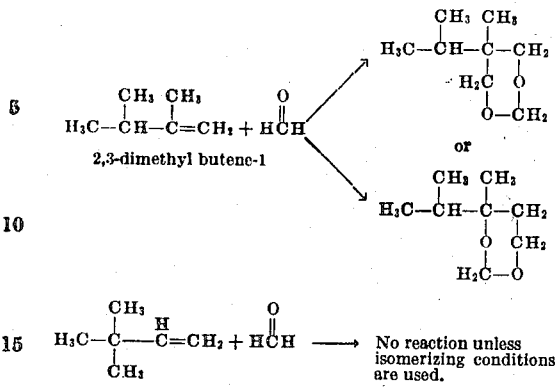

2,3-dimethyl butene-2 is the preferred reactant, and when reacted with an excess of formaldehyde it yields two products, probably according to the above equation, one of the products being an unsaturated alcohol and the other a dioxane. 2,3-dimethyl butene-1 also readily reacts with formaldehyde and probably yields products according to the above equation which is a dioxane and may have either of the two structures postulated above. 2,2-dimethyl butene-3 is the least desirable reactant in that it does not react with formaldehyde unless isomerizing conditions are employed. This last isomer, however, may be isomerized by the shifting of a methyl group and possibly also by the shifting of the double bond to give one of the first two dimethyl butene isomers discussed above.

The reaction is catalyzed by a variety of catalysts. Metallic chlorides such as zinc chloride, stannic chloride, mercuric chloride and titanium chloride have been found satisfactory. Sulfuric and hydrochloric acids are also suitable catalysts. A particularly suitable catalyst for dioxane production has been found to be relatively strong sulfuric acid, for example, 25% to 50% sulfuric acid, whereas relatively weak acid such as that of about 5% tends to give the corresponding glycol. The metallic chlorides may be used in combination with sulfuric acid or in combination with hydrochloric acid. When a metallic chloride is used in combination with hydrochloric acid, it has been found satisfactory to add the acid in the form of hydrogen chloride gas. Small amounts of catalyst give satisfactory results.

The reaction occurs at relatively low temperatures, for example, between 0° C. and 150° C. The temperature which is employed depends somewhat on the catalyst. For example, with 40% sulfuric acid catalyst, 25° to 50° C. is suitable, whereas with weaker acid a higher temperature is desirable. When metallic chloride catalysts such as $SnCl_4$ are employed, satisfactory reaction rates may be obtained at room temperature.

The mixing of formaldehyde with a dimethyl butene may be made in any manner. The ordinary procedure is to mix the reactants and add the catalyst to the mixture but satisfactory results may be obtained from any other order of mixing the catalyst and the starting materials.

The reaction products have the triptane structure and are readily converted to other compounds having a triptane structure. The unsaturated alcohol may be hydrogenated to a saturated alcohol or completely to triptane. The olefinic group of the unsaturated alcohol undergoes reactions normally, for example, in the addition of halogens and acids. The dioxane may be hydrolyzed to a dihydroxy triptane, which may be converted to esters, ethers and other derivatives, or to the unsaturated alcohol by dehydration.

The addition products of formaldehyde and dimethyl butene are valuable in that they may be readily converted to triptane or to intermediate products which may be converted to triptane. The addition products themselves are valuable as high octane blending agents in aviation gasoline.

Example 1

590 grams (7 mols) of 2,3-dimethyl butene-2 was mixed with 225 grams (7.5 mols) of paraformaldehyde and 23.8 grams of mercuric chloride. Hydrogen chloride gas was passed through the mixture at room temperature. After one and one-half hours the solid para-formaldehyde had disappeared, after two and one-third hours a solid appeared and the absorption of hydrogen chloride ceased. At this point, 260 grams of hydrogen chloride had been absorbed. The product was steam-distilled whereby 730 grams of material were collected. The organic material from the steam distillation was fractionally distilled and 303 grams of alcohol was recovered which represents 38% of the theoretical. The boiling point was 75° C. at 70 mm. of pressure. The alcohol was 2,3,3-trimethyl 4-ol butene-1, and had a refractive index of $n_D^{20}$ 1.4450, and a bromine number of 99.2-cg./cc. indicating 85.5% unsaturation. Carbon and hydrogen analysis gave: C=73.90% and H=11.32%. The theoretical for 2,3,3-trimethyl 4-ol butene-1 is: C=73.62% and H=12.32%. Another fraction from the distillation was obtained which had a boiling point of 120° C. at 200 mm. This fraction amounted to 189.5 grams and represented a theoretical yield of 18.4% calculated as the compound 4,4,5,5-tetramethyl meta dioxane. Carbon and hydrogen analysis gave: C=66.72% and H=11.17%, the theoretical percentages for the dioxane being C=66.63% and H=11.18%. Other products separated by the distillation were 29% of 2,3-dimethyl 3-chlor butane and 6.2% of an unidentified solid boiling at 138° C. at 200 mm. and 8.1% of a polymer residue.

Example 2

3.5 mols of 2,3-dimethyl butene-2 was reacted with 2.5 mols of formaldehyde in the form of a 37% aqueous solution, in the presence of 40% sulfuric acid as a catalyst, at 90° F. The compound, 4,4,5,5-tetra methyl meta dioxane, was obtained in a 93% yield. Carbon and hydrogen analysis gave: C=66.63%; H=11.25%, the theoretical percentages being C=66.63% and H=11.18%. The product was highly stable to hydrogenation conditions; 10 hours at 300° C. under 2000-3000 pounds per square inch of hydrogen pressure in the presence of Raney nickel catalyst did not cause a substantial change in the meta dioxane.

Example 3

2.75 mols of 2,3-dimethyl butene-1 were stirred with 2.5 mols of formaldehyde in the form of a 37% aqueous solution for six hours at 70-90° F. in the presence of 40% sulfuric acid as a catalyst. A 25.5% yield of material boiling in the dioxane range was obtained and about one-fourth of this material was a solid which appeared identical to the solid obtained in Example 2; 4,4,5,5-tetramethyl meta dioxane. The other three-fourths of the product isolated was a liquid and was probably 2-methyl 2-isopropyl or 3-methyl 3-isopropyl meta dioxane. Since this addition reaction yielded a dioxane the same as that from the addition reaction of Example 2, it appears that there has been a partial isomerization of 2,3-dimethyl butene-1 to 2,3-dimethyl butene-2 during the course of the reaction.

Since under ordinary addition reaction conditions 2,2-dimethyl butene-2 does not add formaldehyde, it is possible to separate the other two isomeric dimethyl butenes from this one by the addition process herein described by making the addition under non-isomerizing conditions. When 2,2-dimethyl butene-3 is reacted with formaldehyde in the presence of a strongly isomerizing catalyst there is isomerization of the dimethyl butene and addition of formaldehyde to the isomerized dimethyl butenes.

This invention may be practiced in a continuous manner by continuously adding the reaction mixture containing dimethyl butene, formaldehyde and catalyst to a reaction vessel and continuously withdrawing the reaction mixture from the said vessel after an initial period required to substantially complete the reaction in the original charge to the said vessel. Another method of continuous operation contemplated is that wherein a series of reaction vessels is employed and wherein the reaction mixture is charged to the first vessel and allowed to remain for a short time and later transferred to the succeeding vessels as the preceding vessels are filled with the reaction mixture which is continuously added to the first reaction vessel in the series. After the first charge has progressed through the series of vessels to the last vessel, it is continuously withdrawn from said last vessel and subjected to reaction steps whereby the reaction products are separated and purified.

The products of the reaction may be separated from the reaction mixture by the usual methods, for example, by vacuum or steam distillation followed by a fractional distillation of the dried organic material.

What is claimed and sought to be secured by Letters Patent is:

1. A process for the preparation of an addition product of a 2,3-dimethyl butene and formaldehyde which comprises reacting said dimethyl butene with formaldehyde in the presence of an acidic condensation catalyst that promotes addition of formaldehyde to an olefin double bond.

2. A process for the preparation of an addition product of a 2,3-dimethyl butene and an equimolar amount of formaldehyde which comprises reacting said dimethyl butene with an equimolar amount of formaldehyde in the presence of an acidic condensation catalyst that promotes addition of formaldehyde to an olefin double bond.

3. A process for the preparation of an addition product of a 2,3-dimethyl butene and twice the molar amount of formaldehyde which comprises reacting said dimethyl butene with twice the molar amount of formaldehyde in the presence of an acidic condensation catalyst that promotes addition of formaldehyde to an olefin double bond.

4. A process for the preparation of an addition product of 2,3-dimethyl butene-2 and formaldehyde which comprises reacting 2,3-dimethyl butene-2 with formaldehyde in the presence of an acidic condensation catalyst that promotes addition of formaldehyde to an olefin double bond.

5. A process for the preparation of an addition product of 2,3-dimethyl butene-1 and formaldehyde which comprises reacting 2,3-dimethyl butene-1 with formaldehyde in the presence of a catalyst that promotes addition of formaldehyde to an olefin double bond.

6. 2,3,3-trimethyl 4-ol butene-1.

7. A process for the preparation of an addition compound of 2,3-dimethyl butene-2 and twice the molar amount of formaldehyde which comprises reacting 2,3-dimethyl butene-2 with twice the molar amount of formaldehyde in the presence of sulfuric acid of at least 25 percent concentration, the addition product being essentially a mixture of 2,3,3-trimethyl 4-ol butene-1 and 4,4,5,5-tetramethyl meta dioxane.

JOHN C. MUNDAY.
ALFRED H. MATUSZAK.

REFERENCES CITED

The following references are of record in the file of this patent:

UNITED STATES PATENTS

| Number | Name | Date |
|---|---|---|
| 2,241,777 | Friedrichsen | May 13, 1941 |
| 2,308,192 | Mikeska | Jan. 12, 1943 |
| 2,337,059 | Mikeska et al. | Dec. 21, 1943 |
| 2,421,862 | Arundale et al. | June 10, 1947 |
| 2,426,017 | Hamblet et al. | Aug. 19, 1947 |

FOREIGN PATENTS

| Number | Country | Date |
|---|---|---|
| 507,571 | Great Britain | June 14, 1939 |